US011157521B2

(12) United States Patent
Guzik

(10) Patent No.: US 11,157,521 B2
(45) Date of Patent: Oct. 26, 2021

(54) CORRELATING MULTIPLE SOURCES

(71) Applicants: WHP WORKFLOW SOLUTIONS, INC., North Charleston, SC (US); GETAC TECHNOLOGY CORPORATION, Taipei (TW)

(72) Inventor: Thomas Guzik, Edina, MN (US)

(73) Assignees: Getac Technology Corporation, Taipei (TW); WHP Workflow Solutions, Inc., North Charleston, SC (US)

( * ) Notice: Subject to any disclaimer, the term of this patent is extended or adjusted under 35 U.S.C. 154(b) by 635 days.

(21) Appl. No.: 15/197,683

(22) Filed: Jun. 29, 2016

(65) Prior Publication Data

US 2018/0004834 A1    Jan. 4, 2018

(51) Int. Cl.
*G06F 16/28* (2019.01)
*G06F 16/29* (2019.01)
(Continued)

(52) U.S. Cl.
CPC .......... *G06F 16/285* (2019.01); *G06F 3/0486* (2013.01); *G06F 3/04845* (2013.01);
(Continued)

(58) Field of Classification Search
CPC ......... G06F 17/30864; G06F 17/30038; G06F 17/30011; G06F 17/3012; G06F 17/30268; G06F 17/30321; G06F 17/30424; G06F 17/3082; G06F 17/3089; G06F 17/30911; G06F 17/30997; G06F 17/30017; G06F 17/3056; G06F 17/30613; G06F 17/30634; G06F 17/30943; G06F 17/30047; G06F 17/30233; G06F 16/285; G06F 16/48; G06F 16/29; G06F 16/245; G06F 17/241; G06F 16/24; G06F 16/24573; G06F 3/04845;
(Continued)

(56) References Cited

U.S. PATENT DOCUMENTS 9,210,393 B2 * 12/2015 Chen ................. H04N 21/42202
2006/0036468 A1 * 2/2006 Thomas ................. G06Q 10/10
705/1.1

(Continued)

OTHER PUBLICATIONS

International Search Report & Written Opinion dated Aug. 21, 2017 for PCT Application No. PCT/US2017/039939, 9 pages.

*Primary Examiner* — Alford W Kindred
*Assistant Examiner* — Cecile H Vo
(74) *Attorney, Agent, or Firm* — Han Santos, PLLC

(57) ABSTRACT

A method and system of correlating annotations of media files. A first media file is received from a first media recording device. A file record for the first media file is created in the file table. A determination is made whether the first media file belongs to an existing matter group. Upon determining that the first media file belongs to an existing matter group: the file record is related with the existing matter group in the file table; annotations of the first media file that are flagged to be shared, are related to all media files of the existing matter group; and annotations of all the media files of the existing matter group to the first media file are related. Upon determining that the first media file does not belong to an existing matter group, a new matter group is created for the first media file in the matter table of the central server.

10 Claims, 9 Drawing Sheets

(51) Int. Cl.
*G06F 16/48* (2019.01)
*G06F 16/435* (2019.01)
*G06F 16/2458* (2019.01)
*G06F 16/2457* (2019.01)
*G06F 40/169* (2020.01)
*G06F 3/0484* (2013.01)
*G06F 3/0486* (2013.01)
*G06Q 50/26* (2012.01)
*G06F 16/24* (2019.01)

(52) U.S. Cl.
CPC .... *G06F 16/2477* (2019.01); *G06F 16/24573* (2019.01); *G06F 16/29* (2019.01); *G06F 16/435* (2019.01); *G06F 16/48* (2019.01); *G06F 40/169* (2020.01); *G06Q 50/26* (2013.01)

(58) Field of Classification Search
CPC .... G06F 3/0486; G06F 16/43; G06F 17/2477; G06Q 50/01; G06Q 50/26; G11B 27/034; H04N 21/6125
USPC ... 707/E17.009, 802, E17.044, 822, E17.01, 707/E17.017, 687, 705, 707, 715, 812, 707/999.005, 999.104, 999.003, 736, 707/E17.005, 769, E17.014, 737
See application file for complete search history.

(56) References Cited

U.S. PATENT DOCUMENTS

| | | | |
|---|---|---|---|
| 2007/0002946 A1* | 1/2007 | Bouton | H04N 19/115 375/240.01 |
| 2010/0175024 A1* | 7/2010 | Schumacher | G06F 16/24556 715/810 |
| 2010/0274816 A1* | 10/2010 | Guzik | H04N 21/2743 707/802 |
| 2016/0034361 A1* | 2/2016 | Block | H04L 63/1416 714/4.12 |
| 2016/0048576 A1* | 2/2016 | Yamaoka | H04W 4/029 707/737 |

* cited by examiner

Matter Table (402b)

| Case ID | Case Name | Notes |
|---|---|---|
| 903 | Smith Homicide | Lorem ipsum dolor sit amet |
| 904 | Pike Street Drug Bust | Consectetur adipscing elit |

Files Table (404b)

| File ID | Case ID | Media File ID | Officer Name | Annotations (Shared) | Annotations (Local) |
|---|---|---|---|---|---|
| 711 | 903 | 601 | Abel Beech | Sed do eiusmod tempor incididunt ut labore et dolore magna aliqua | Ut enim nostrud |
| 712 | 904 | 602 | Burt Carson | Ut enim ad minim veniam | Nisi ut exercitation |
| 713 | 903 | 603 | Carl Devon | Quis nostrud exercitation ullamco laboris | Magna et dolore |
| 714 | 904 | 604 | David Eichen | Nisi ut aliquip ex ea commodo consequat. | Ullamco aliqua |
| 715 | 904 | 605 | Officer 1 | Duis aute irure dolor in reprehenderit in voluptate | *Irure puela* |
| 716 | 904 | 606 | Officer 2 | Velit esse cillum dolore eu fugiat nulla pariatur | *Cillium dolore* |

Media Table (406b)

| Media File ID | File ID | File Path |
|---|---|---|
| 601 | 711 | \\myserver\file1.mp4 |
| 602 | 712 | \\myserver\file2.mp4 |
| 603 | 713 | \\myserver\file3.mp4 |
| 604 | 714 | \\myserver\file4.mp4 |
| 605 | 715 | \\myserver\file5.mpg |
| 606 | 716 | \\myserver\file6.mpg |

FIG. 4B

Matter Table — 402c

| Case ID | Case Name | Notes |
|---|---|---|
| 903 | Smith Homicide | Lorem ipsum dolor sit amet |
| 904 | Pike Street Drug Bust | Consectetur adipscing elit |
| 905 | Jones Burglary | Excepteur sint occaecat cupidatat |

File Table — 404c

| File ID | Case ID | Media File ID | Officer Name | Annotations (Shared) | Annotations (Local) |
|---|---|---|---|---|---|
| 711 | 903 | 601 | Abel Beech | Sed do eiusmod tempor incididunt ut labore et dolore magna aliqua | Ut enim nostrud |
| 712 | 904 | 602 | Burt Carson | Ut enim ad minim veniam | Nisi ut exercitation |
| 713 | 903 | 603 | Carl Devon | Quis nostrud exercitation ullamco laboris | Magna et dolore |
| 714 | 904 | 604 | David Eichen | Nisi ut aliquip ex ea commodo consequat. | Ullamco aliqua |
| 715 | 904 | 605 | Officer 1 | Duis aute irure dolor in reprehenderit in voluptate | Irure puela |
| 716 | 904 | 606 | Officer 2 | Velit esse cillum dolore eu fugiat nulla pariatur | Cillium dolore |
| 717 | 905 | 607 | Officer 1 | Non proident sunt in culpa qui officia | Ut ad cilium |
| 718 | 905 | 608 | Officer 2 | Deserunt mollit anim id est laborum | Veniam ad minimum |

Media Table — 406c

| Media File ID | File ID | File Path |
|---|---|---|
| 601 | 711 | \\myserver\file1.mp4 |
| 602 | 712 | \\myserver\file2.mp4 |
| 603 | 713 | \\myserver\file3.mp4 |
| 604 | 714 | \\myserver\file4.mp4 |
| 605 | 715 | \\myserver\file5.mpg |
| 606 | 716 | \\myserver\file6.mpg |
| 607 | 717 | \\myserver\file7.mpg |
| 608 | 718 | \\myserver\file8.mpg |

FIG. 4C

Files Table

| File ID | Case ID | Provi-sional | Media File ID | Officer Name | Annotations (Shared) | Annotations (Local) |
|---|---|---|---|---|---|---|
| 711 | 903 | 0 | 601 | Abel Beech | Sed do eiusmod tempor incididunt ut labore et dolore magna aliqua | Ut enim nostrud |
| 712 | 904 | 0 | 602 | Burt Carson | Ut enim ad minim veniam | Nisi ut exercitation |
| 713 | 903 | 0 | 603 | Carl Devon | Quis nostrud exercitation ullamco laboris | Magna et dolore |
| 714 | 904 | 1 | 604 | David Eichen | Nisi ut aliquip ex ea commodo consequat. | Ullamco aliqua |

FIG. 7

CORRELATING MULTIPLE SOURCES

BACKGROUND

Today, media data may be in different formats, such as video, audio, still images, text, etc. Such media data may be used for personal as well as for commercial applications, including security and surveillance. For example, police car video cameras, surveillance videos, still pictures of scenes, sound recordings of events, etc., may be used to record events.

In a law enforcement context, media data may be captured and later annotated. Such annotation becomes increasingly difficult when managing a large number of media files. This challenge is exacerbated when media data, which may be disparate in type, is aggregated or correlated to an associated matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIGS. 4A, 4B, and 4C illustrate example matter, file, and media tables.

FIG. 7 illustrates a matter table, consistent with an exemplary embodiment.

DETAILED DESCRIPTION

Overview

Figure 1:
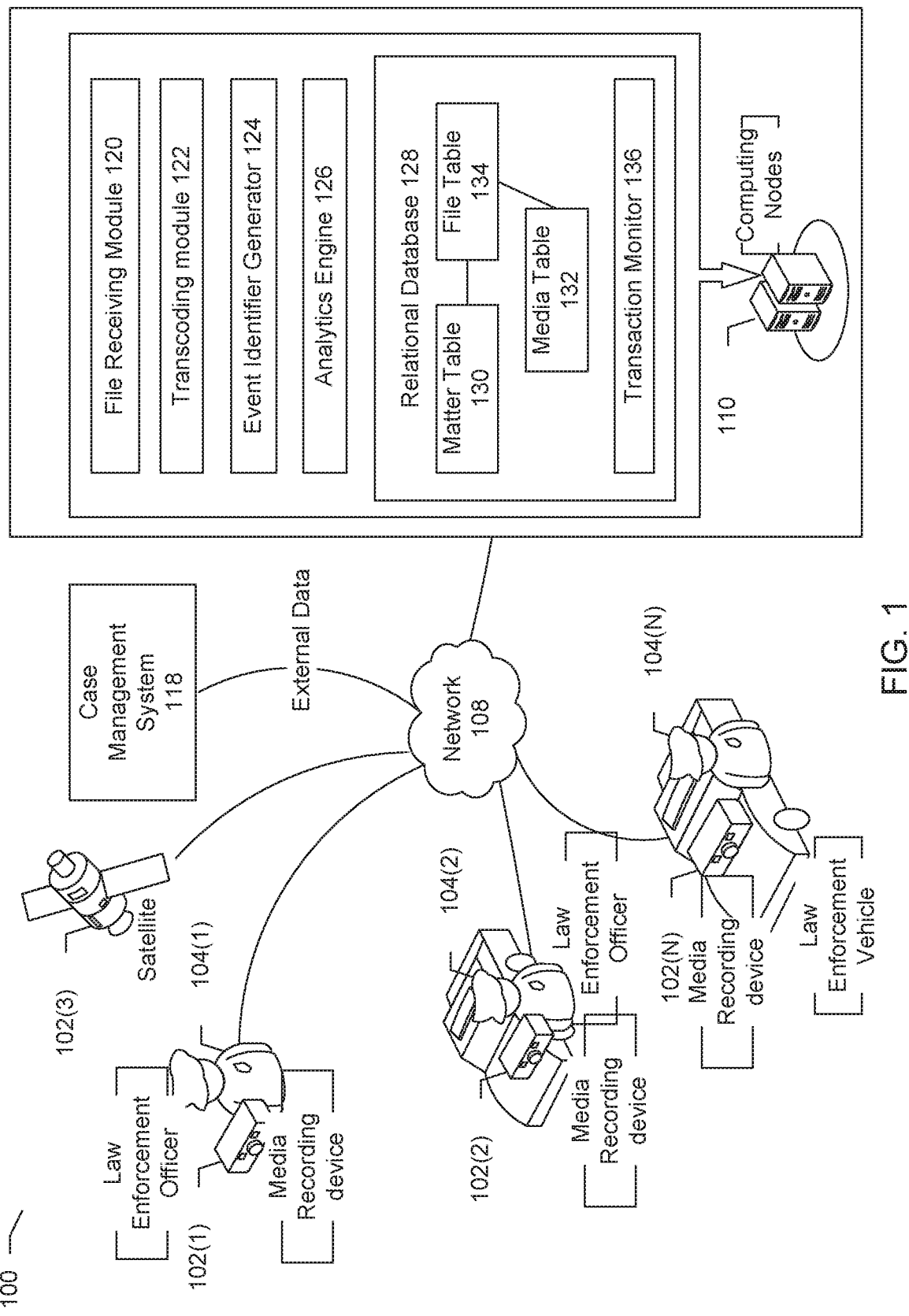
FIG. 1 illustrates an example architecture for implementing a system for correlating the annotations of media files.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure generally relates to methods and systems of managing data assets, and more particularly, to correlating annotations of media files to a matter group, such as a law enforcement incident or case number. In various embodiments, media data, which may be disparate in type, is automatically annotated based on a correlation of the media data with a matter group. As used herein, a media file, sometimes referred to herein as a data asset, is any form of media file, such as text, graphics, picture, video, animation, and sound.

There are many different types of combinations of media files. Such combinations may be of similar media, as in making a panoramic composite photo by stitching together different digital photos. Further, such combinations may be of different media, such as adding a custom audio track to a video. Such combinations may even be of the same incident, such as providing different views of the same police, fire and/or security incident. In some situations, different contexts may be combined such as with a mashup. Such combinations need not be composites and may be presented as various different correlated media files displayed side by side, or as combined into an integrated whole.

To support automating the annotation of media files, the embodiments described herein allow a range of correlating annotations (e.g., metadata) to be associated with a media file. When two or more media files are to be combined to be part of a group, as a composite or otherwise, the metadata may provide a referent by which each media file may be correlated. Upon determining that a media file belongs to a group, the annotations are automatically propagated to that media file. Common metadata may include, but is not limited to, date/time stamp and location metadata.

For example, a video clip may have date/time information stored for each frame, and an audio clip may have date/time information stored for each track segment. Upon determining that the two media files belong to a common group, the metadata associated with one media file is transferred to the other media file. Put differently, the video clip and the audio clip may later be combined into a multimedia presentation since they belong to the same group. In this scenario, the correlation is a synchronization of the two media files and the presentation is a composite of the two files. It will be understood that the number of such media files that may be combined is not limited to two.

In various embodiments, correlation can be based on multiple annotation (e.g., metadata) values. For example, multiple still photos might be stored not only with date/time stamp metadata, but also with location metadata, possibly from a global positioning satellite (GPS) stamp. A software tool that collects all stored still photos taken within a window of time (e.g., during a security or police response to a crime scene) that have a similar geolocation (e.g., within a predetermined range of a crime scene), may combine the photos of the incident into a matter group, which may later be used to generate a sequence of pictures for investigation purposes. Here the correlation is both by time and location. The presentation is a non-composite simultaneous display of different media files.

In one embodiment, correlating metadata can be based on predetermined fields. For example, several video clips may be annotated with an incident name. Consider three police officers arriving at a scene of an event. Each one of the officers has at least one media recording device and is videotaping the scene from different angles at a similar time. In various embodiments, each of the recordings is automatically annotated with the same metadata. That is because a central server identifies each of the media recording devices to belong to the same group (e.g., they were dispatched with the same case identification (ID)). For example, the officers carrying the media recording devices may have been dispatched together, or the signature of the metadata of their media files provides a correlation between the different metadata. In this way each media file generated by the disparate media recording devices can be identified to be part of the same matter group (e.g., police event). Alternatively or in addition, during the recording or upon completion of the recording of the media file, an officer may annotate the media file with additional information (e.g., name of the subject, cross-street, temperature reading, etc.). In one embodiment, this metadata, captured by one media recording device in connection with a media file, may be sent to (or relationally associated with) the other media recording devices having media files deemed to be in the same matter group. The determination of what media files belong together is performed by the central server. Thus, the other officers do not have to manually enter the same annotation information for their media files. That is because it is automatically provided by the central server for media files that belong to the same matter group.

Such degree of flexibility means that correlations can be both by absolute referent and by relative referent. Most incidents occur at an absolute time and location, and incidents may occur at different locations (such as a bank robbery occurring at a bank, and a breaking and entering at a power main to shut off the power to enable the robbery). Another example would be the security of an event over multiple locations such as the election or the Olympics, which are held at different venues in a city or different cities. In other situations, incidents, such as a high speed chase may span multiple regions.

The techniques described herein may be implemented in a number of ways. Example implementations are provided below with reference to the following figures.

Example Network Architecture

FIG. 1 illustrates an example architecture 100 for implementing a system for correlating the annotations of media files. The architecture 100 may include media recording devices 102(1)-102(N). Each of the media recording devices 102(1)-102(N) may be a video recording device, an audio recording device, or a multimedia recording device that records both video and audio data. In case of the satellite 102(d) the media recording device may be a camera that acquires images in the visible and infrared range. The media recording devices 102(1)-102(N) may include recording devices that are worn on the bodies of law enforcement officers, recording devices that are attached to the equipment, e.g., motor vehicles, personal transporters, bicycles, etc., used by the law enforcement officers. For example, a law enforcement officer 104(1) that is on foot patrol may be wearing the media recording device 102(1). In the same example, a law enforcement officer 104(1) that is on vehicle patrol may be wearing a media recording device 102(2). Further, a patrol vehicle of the law enforcement officer 104(N) may be equipped with the media recording device 102(N).

Each of the media recording devices 102(1)-102(N) may include on-board memory that stores the media recordings as data assets. Further, each media recording device may be equipped with communication capabilities for transmitting the media files to a central server 106. An example architecture of a media recording device is discussed in more detail in view of FIG. 2.

In some instances, the media recording device 102(1) may send media files to the central server 106 via a network 108. The media recording device 102(2) may form an ad-hoc communication connection with a local computing device (e.g., on-board computer) in the patrol vehicle of the law enforcement officer 104(2). In turn, the local computing device may forward the media files recorded by the media recording device 102(2) to the central server 106 via the network 108. The network 108 may be, without limitation, a local area network ("LAN"), a larger network such as a wide area network ("WAN"), a carrier network, or a collection of networks, such as the Internet. Protocols for network communication, such as TCP/IP, may be used to implement the network 108. The network 108 may provide telecommunication and data communication in accordance with one or more technical standards.

In some embodiments, a media recording device may be equipped with telemetry software and hardware that provide the device with ability to generate telemetry data for periodic transmission to the central server 106 via the network 108. The telemetry hardware may include a global positioning system (GPS) chip, an assisted GPS (A-GPS) chip, or other equivalent geo-positioning sensor. The telemetry data generated by the media recording device may include the identification information of the device, the periodic geolocation readings of the device, as well as the time and date stamp for each geolocation reading. For example, in some instances, a media recording device may be capable of taking a geolocation reading at predetermined intervals (e.g., every 10 sec). In other embodiments, a media recording device may be reliant upon another device to provide telemetry data to the central server 106. For example, a computing device attached to the media recording device 102(2) may have geo-positioning capabilities. As such, the media recording device may rely on the attached computing device to provide the telemetry data to the central server 106 via the network 108. In one embodiment, a media file is automatically annotated with such telemetry information.

The central server 106 may be part of a facility that is operated by a law enforcement agency, or a facility that is operated by a third-party that is offering services to the law enforcement agency. The central server 106 may use computing nodes 110 to host various modules, such as a file receiving module 120, transcoding module 122, event identifier generator 124, analytics engine 126 and transaction monitor 136. Each one of these modules is explained in more detail below.

The computing nodes 110 of the central server 106 may include general purpose computers, such as desktop computers, tablet computers, laptop computers, servers, or other electronic devices that are capable of receiving inputs, processing the inputs, and generating output data. In other embodiments, the computing nodes 110 may be virtual computing devices in the form of virtual machines or software containers that are hosted in a cloud. In one example, the central server may include a processor, a network interface coupled to the processor configured to enable communications via a communication network, a storage device for content and programming, a program stored in the storage device, wherein execution of the program by the processor configures the central server to perform various functions discussed herein.

The file receiving module 120 of the central server 106 receives data content from various media recording devices 102(1) to 102(N). The data content may be the media file and/or annotations captured in connection with the corresponding media file. The data content may be received over the network 108 via, for example, File Transfer Protocol (FTP), WebDAV, or other protocols. File receiving module 120 may also be configured to provide both upload and download, thereby enabling bidirectional file transfer. For example, the file receiving module 120 may send relevant annotations to one or more media recording devices for their media file by way of the central server 106. File receiving module 120 may operate substantively in real time, at periodic intervals, or waiting of upload notifications in a push architecture.

File receiving module 120 may validate incoming files, receive associated metadata, receive secure signatures associated with uploading multi-media files from physical media, and may delete files from physical media upon successful upload. File receiving module 120 may integrate with other systems such as a police case management system 118. For example, when a multi-media file is received, file receiving module 120 may request a case identifier from the police case management system 118 and store the case identifier with the multi-media file. In this way, a multi-media file can be guaranteed to be associated with a case.

The transcoding module 122 may translate a received media file's format to another file's format. Transcoding may also be known as file conversion, refactoring and format recopy. For example, if a law enforcement installation has standardized on H.264 for video files, transcoding module 122 may transform incoming files in AVI format to H.264. For example, the transcoding of a media file may involve converting a file format of the media file to generate a copy of the media file that is in another file format.

In some embodiments, the analytics engine 126 may also perform redaction for a media file. The redaction may involve the filtering out certain audio snippets or video images. For example, a name of a specific person may be bleeped out of a media file or the face of the specific person as captured in a video asset may be blurred or pixelated to protect the identity of the person. In such instances, the analytics engine 126 may use an audio or facial recognition software to detect the audio snippet and/or facial images in a media file for modification.

The event identifier generator 124 may be used to generate a group matter in the form of an event identifier number (e.g., case ID) guaranteed to be unique. For example, event identifier generator 124 may use a globally unique identifier ("GUID") generator or remote procedure call (RPC) universal unique identifier ("UUID") generator to guarantee uniqueness. Alternatively, the event identifier generator 124 may be an auto-populating index value in a relational database.

The analytics engine 126 may periodically receive media files from the media recording devices 102(1)-102(N). Additionally, the analytics engine 126 may also receive telemetry information directly from each media recording device or an associated computing device. In various embodiments, the analytics engine 126 may obtain the media files and the telemetry information by data push or data pull. In data push, each media recording device may actively send the media files including the telemetry information to the analytics engine 126 on a periodic basis. In data pull, the analytics engine 126 may actively poll each media recording device for the media files including the telemetry information on a recurring basis.

The analytics engine 126 may receive components of the media file (e.g., annotations, which are discussed in more detail a later section) from media recording devices 102(1)-102(N) and store such information into its memory and/or a memory of the case management system 118. In various embodiments, the analytics engine 126 may periodically pull data (e.g., just the annotations or the media file including the annotations) from each media recording device by sending a request for the media file and/or its corresponding annotations. Each media file may include annotations that documents various aspects of the media file, such as the time and date at which the media file was recorded, the duration of the media file, the device identifier of the media recording device, the geolocation at which the media file is recorded, additional entries provided by the operator of the media recording device, etc. Accordingly, the analytics engine 126 may propagate relevant annotations (e.g., annotations that are flagged to be propagated) to other media files of a same matter group (e.g., having a common event identifier).

In some embodiments, the analytics engine 126 may obtain supplemental information from the case management system 118. The supplemental information may include incident reports, police investigation reports, law enforcement officer station assignments, patrol vehicle assignments, arrest records, judicial records, and/or other relevant information. The analytics engine 126 may correlate the supplemental information obtained from the case management system 118 with the annotations of a group (e.g., having a common event identifier) based on identification keys from the group annotations. The identification keys may include incident identifiers, case identifiers, personnel identification information, suspect identification information, time and date stamps, and/or so forth. The supplemental information from the case management system may enable the analytics engine 126 to enhance the annotations of the matter table 130 related to an event identifier.

The central server includes a relational database 128 including a matter table 130, a media table 132, and a file table 134 that are structured in a master-detail-detail relationship. The matter table 130 stores information relating to the matter group (or indicia why the files would be grouped together). All annotations that relate to the matter group are stored in the matter table 130. Generally, the matter table 130 also includes an identifier of any external data to be associated with the matter. In various embodiments, an identifier may be, without limitation, a case ID (e.g., the event identifier of the crime case in the case management system 118 used by the law enforcement).

The media table 132 is configured to store a binary file of media data content of media files and/or a reference to a location of each media file. Although the media table could be stored with the file table 134, the media table 132 is typically stored separate from the file table 134 because media files may be a large. By virtue of separating the media file from the file table, text queries on the file table 134 are expedited. As a detail table, it stores a reference to the matter it is associated with (i.e., an event identifier).

The file table 134 is configured to store annotations specific to the media file. The annotations may include, without limitation, descriptions of the media file and/or the context of the media file, such as name of the subject, cross-street, comments from the operator (e.g., police officer) of the media recording device, and other metadata. The file table 134 may have predetermined fields that include the file ID, (event identifier (e.g., case ID), and the media file ID of the present that the present media file is associated with. These fields may be populated automatically at the beginning of the recording of the media file if the event identifier (e.g., case ID) is known. These fields may be populated during the recording of the media file, if the event identifier is determined during the recording, or is added during a post-processing step (e.g., where a user manually enters the event identifier or it is provided by the central server). Such annotations may be manually added by the operator of the media recording device or may be performed by automation, such as tagging, which may be performed via software tools and by scripting on the media recording device.

In one embodiment, not all annotations of the file table 224 are not propagated (e.g., shared) with other media files. For example, annotations that are to be shared are flagged (e.g., by placing such annotations in a separate column). The matter table structure and its relationship to file data and media data, is discussed in more detail later in the context of FIG. 7.

The transaction monitor 136 provides a layer of assurance that predetermined operations are either all performed, or none are performed. Specifically, where a first operation and a second operation are to be bound in a transaction, if either of the first or second operations fail, then both operations are undone, or rolled back in the transaction parlance. In this way, the first and second operations are guaranteed to be an atomic, isolated, consistent and durable operation. The transaction monitor 136 helps ensure that as the three tables (i.e., matter table 130, media table 132, and file table 134) are written to, that it is not possible to write to one table, but not to the other, thereby creating an inconsistency in the tables. If a first table is written to, but a write to a second table fails for whatever reason, the change to the first table is "undone" (e.g., rolled back). Accordingly, changes to all tables are in harmony and never inconsistent. The operation of the transaction monitor 136 is described in more detail later.

Many other sub-modules may reside in the computing nodes 110 of the central server 106. In general, any operation that may be performed on a multi-media file, be it to add data to the file, associate data/metadata to the file, delete data in the file, edit the file, transform the file, transcode the file, and the like may be performed by a sub-module. There may be sub-modules with redundant functionality.

Example Media Recording Device Components

Figure 2:
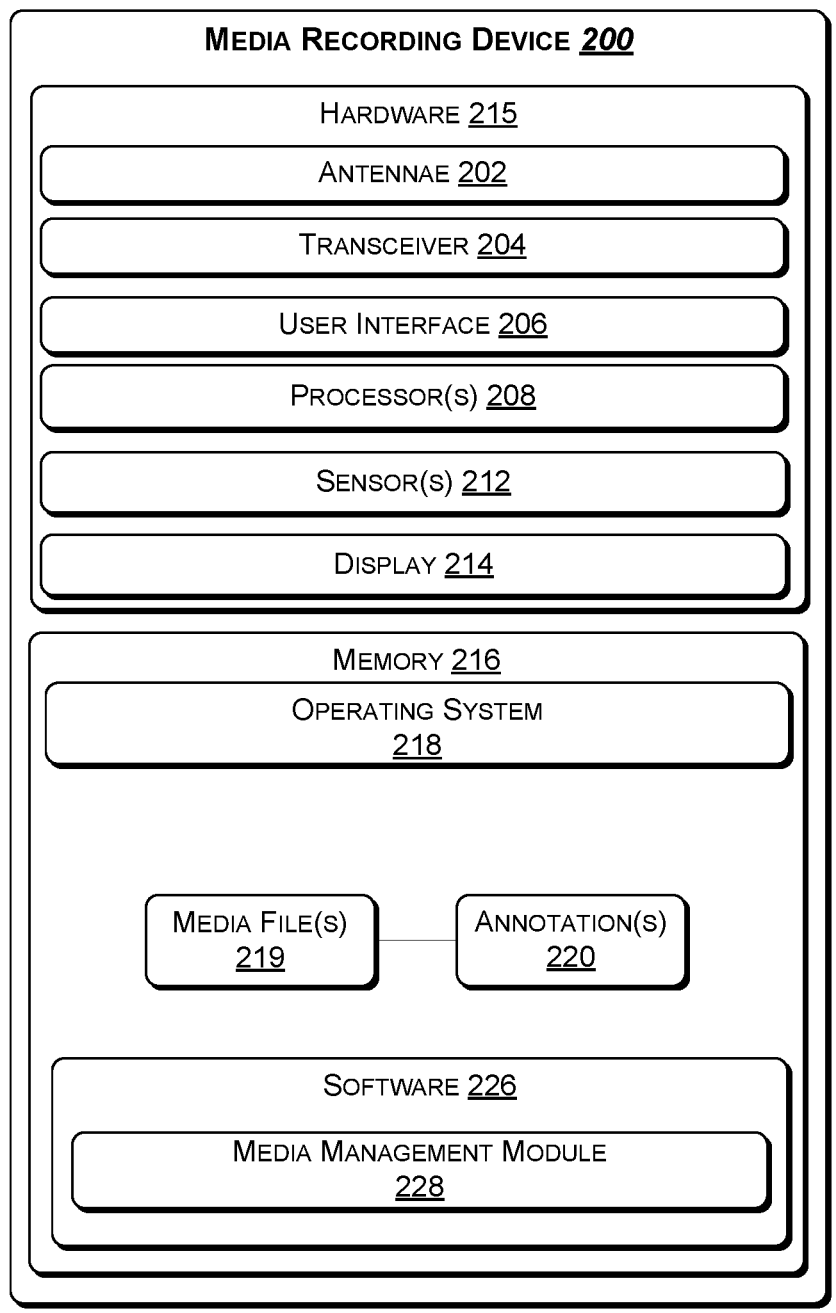
FIG. 2 is a block diagram showing various components of an illustrative media recording device.

FIG. 2 is a block diagram showing various components of an illustrative media recording device 200. As discussed in the context of FIG. 1, the capture of multimedia and the annotation thereof involves an interaction with appropriately configured media recording devices. To that end, it may be useful to consider the functional elements/aspects of an exemplary media recording device, at a high-level. For purposes of such a discussion, FIG. 2 provides a block diagram illustration of an exemplary media recording device 200.

In various embodiments, a media recording device 200 may be a dedicated multimedia device, a handset type mobile phone, or may be incorporated into another device, such as a personal digital assistant (PDA), a tablet computer, installed in a dispatch vehicle, part of a satellite, etc. For discussion purposes, the illustration shows the media recording device 200 in the form of a handheld smart-phone.

The media recording device 200 may include one or more antennae 202, a cellular transceiver 204, a Wi-Fi transceiver 205, user interface 206, one or more processors 208, hardware 210, and memory 216. In some embodiments, the antennae 202 include an uplink antenna that sends radio signals to a radio tower, and a downlink antenna that receives radio signals from the base station. In other embodiments, a single antenna may both send and receive radio signals.

In one embodiment, the media recording device 200 includes a user interface 206 that enables an operator to provide input and receive output from the media recording device 200. For example, the user interface 206 may include a data output device (e.g., visual display, audio speakers, haptic device, etc.) that may be used to enter annotations for a media file that has been captured on the media recording device 200. The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces.

The media recording device 200 may include one or more processors 208, which may be a single-core processor, a multi-core processor, a complex instruction set computing (CISC) processor, or another type of processor. The hardware may include a power source and digital signal processors (DSPs), which may include single-core or multiple-core processors. The processors may perform operation in parallel to process a stream of data that may be provided by the sensors 212 or the software 226.

The hardware 215 may include one or more sensors 212 that are configured to measure the ambient conditions, such as temperature, decibel level, lighting conditions, etc. In one embodiment, the sensors include a GPS sensor.

The hardware 215 may also include network processors that manage communication interfaces, including communication interfaces that interact with peripheral components, such as universal serial bus (USB) memory sticks that can be used to transfer media files and/or annotations from the media recording device 200 to the central server (via one, several, or no intermediaries). The network processors and the peripheral components may be linked by switching fabric. The hardware may further include hardware decoders and encoders, a network interface controller, and/or a universal serial bus (USB) controller.

The network interface controller may enable the processors to transmit and receive data via the USB interface. In some embodiments, the hardware may also include a direct memory access (DMA) engine. The DMA engine may enable the various controllers to access the memory 216 independently of the one or more processors 208 to perform tasks. The various controllers and processors of the media recording device 200 may execute instructions and perform tasks under the direction of software components that are stored in the memory 216.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various components, including software components that are executable or accessible by the processor(s) 208 and controller(s) of the media recording device 200. The various components of the memory 216 may include an operating system 218, one or more media file(s) 219, each media file including annotations 220, and software 226. The annotations 220 for each media file 219 may be divided into annotations that are local (i.e., not to be shared with other media files) and annotations that are flagged to be shared. Each module of the software 226 may include routines, program instructions, objects, and/or data structures that perform particular tasks or implement particular abstract data types. For example, the software 226 of the memory 216 may include a media management software module 228 that is configured to perform various functions, including functions of receiving annotations for a media file of a common group from the central server 106 or directly from other multimedia devices in a wireless communication range of the media recording device.

In a post processing step, the media management module 228 is configured to group media files together as they are dragged and dropped together on the user interface 206 of the media recording device 200. The operator of the media recording device 200 may have an option to edit annotations specific to a media file during such post processing step. The annotations are stored in the file table 224 or ear marked to be stored in the matter table, accordingly.

The operating system 220 may include components that enable the media recording device 200 to receive and transmit data via various interfaces (e.g., user controls, communication interface, and/or memory input/output devices), as well as process data using the processors 204 to generate output. The operating system 220 may include a presentation component that presents the output (e.g., display the data on an electronic display 214 of the media recording device 200, store the data in memory 216, transmit the data to another electronic device, transfer the data at least in part to the central server, etc.). Additionally, the operating system 220 may include other components that perform various additional functions generally associated with an operating system.

Figure 3:
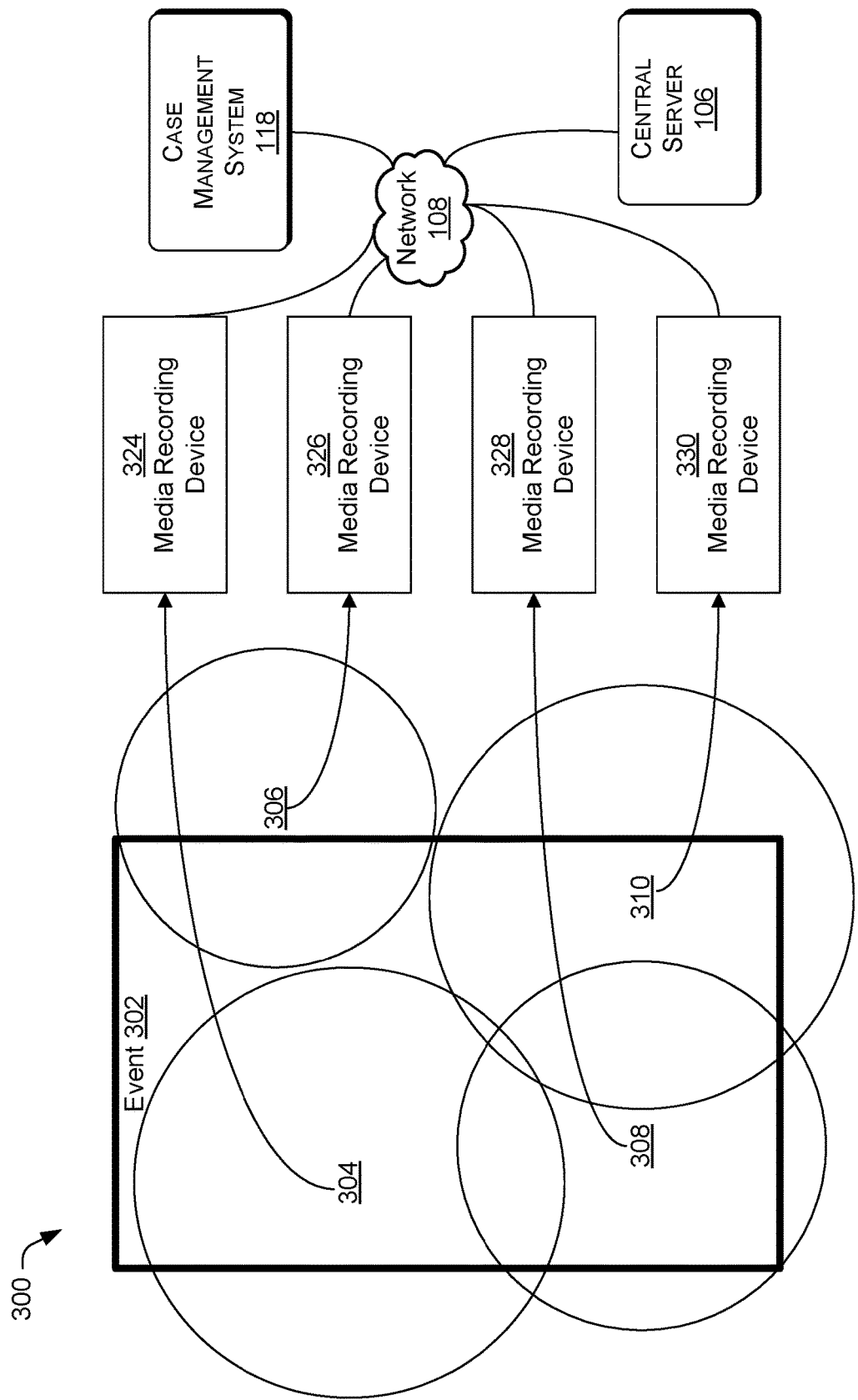
FIG. 3 illustrates an event scene where several media recording devices are creating media files of a common event, consistent with an exemplary embodiment.

Reference now is made to FIG. 3, which illustrates an event scene where several media recording devices are creating media files related to a common event 302, consistent with an exemplary embodiment. Such an event 302 may be, without limitation, a police crime scene, a sporting event, a concert, a geographic location of interest, etc. In system 300, event 302 is captured media recording devices 324, 326, 328, and 330, as represented by scopes 304, 306, 308, and 310, respectively. The data captured by the media recording devices 324 to 330 may be ultimately transferred (e.g., uploaded or streamed) to a central server 106 via the network 108. The media file associated with each media recording device 324 to 330 is correlated by the central server 106 to be part of the same event and therefore of the same matter group. Put differently, the media files related to scopes 304 to 310 have a common event identifier.

The determination of the group may be performed in several ways. For example, if officers carrying the media recording devices 324 and 326 are dispatched to the event 300, the event identifier generator 124 of the central server 106 automatically creates a unique event identifier for the event (e.g., even before the officers arrive at the event 302). In one embodiment, upon the media recording devices 324 and 326 beginning to record (e.g., creating a media file), the officer does not need to provide the event identifier. Rather, the central server automatically sends the event identifier information to the corresponding media recording device. In various embodiments, the central server 106 may provide the event identifier information automatically as soon as the event identifier has been provided by the event identifier generator 124 or upon request from the media recording device (e.g., at the beginning, end, or during the media recording). In one embodiment, if a network 108 connection does not exist, the event identifier may be provided as soon as the network 108 connection becomes available.

By way of demonstrative example, consider the situation where the officer carrying media recording device 328 arrives at the event 302 without having been specifically dispatched to the event 302. Upon beginning to record the event 302 via the media recording device 328, the central server 106 identifies the media file of the media recording device to be related to the event 302 and therefore automatically sends the event identifier to the media recording device 328 via the network 108. In one embodiment, the central server 106 additionally sends all annotations related to the event 302 to the media recording device 328. The central server 106 may identify the media file of the media recording device 328 to belong to the event 302 in several ways. For example, the media recording device 328 may have a GPS receiver that provides its location information to the central server 106. If the location of the media recording device 328 is within a predetermined distance and within a predetermined time window of the event 302, then the media file is associated with the event 302. Accordingly, the officer (e.g., user of the media recording device 328) need not manually enter annotations for the event 302. Rather, the annotations are automatically propagated from the central server 106 to the media recording device, thereby disburdening the officer from having to provide the annotations and increasing the probability that all relevant media files are correlated with the proper matter group.

In one embodiment, annotations that are related to an event 302 are sent directly from one media recording device to another via the network 108. For example, upon the central server 106 determining that a media file of a media recording device (e.g., 324) is associated with an event 302, the annotations of the media file may be exchanged directly between the media recording device (e.g., 324) and another media recording device (e.g., 326) that has been identified by the central server to have a media file that is related to the same event 302.

In one embodiment, the user of the media recording device 324 may want to enter additional annotations related to the event 302. For example, the user interface of the media recording device 324 may provide an option to enter additional annotations related to the media file. Such annotation may be performed before, at, during, or after the media file (e.g., of the media recording device related to the event 302) is generated. In this regard, the operator of the media recording device 324 has a choice as to record the annotation in the file table of the media recording device related to the media file, or to the matter table of the event 302. If the annotation is in the file table of the media file, then the annotation is not propagated to the matter group. Put differently, upon receiving the annotations from the media recording device 324 by the central server 106, the annotations are not propagated by the central server 106 to the other media files related to the event 302. However, if the annotations for the media file are flagged on the media recording device 324 for the matter table, then the annotations are propagated to other media files that belong to the same event 302 (i.e., same matter group).

Table Database Structure

Figure 4A:
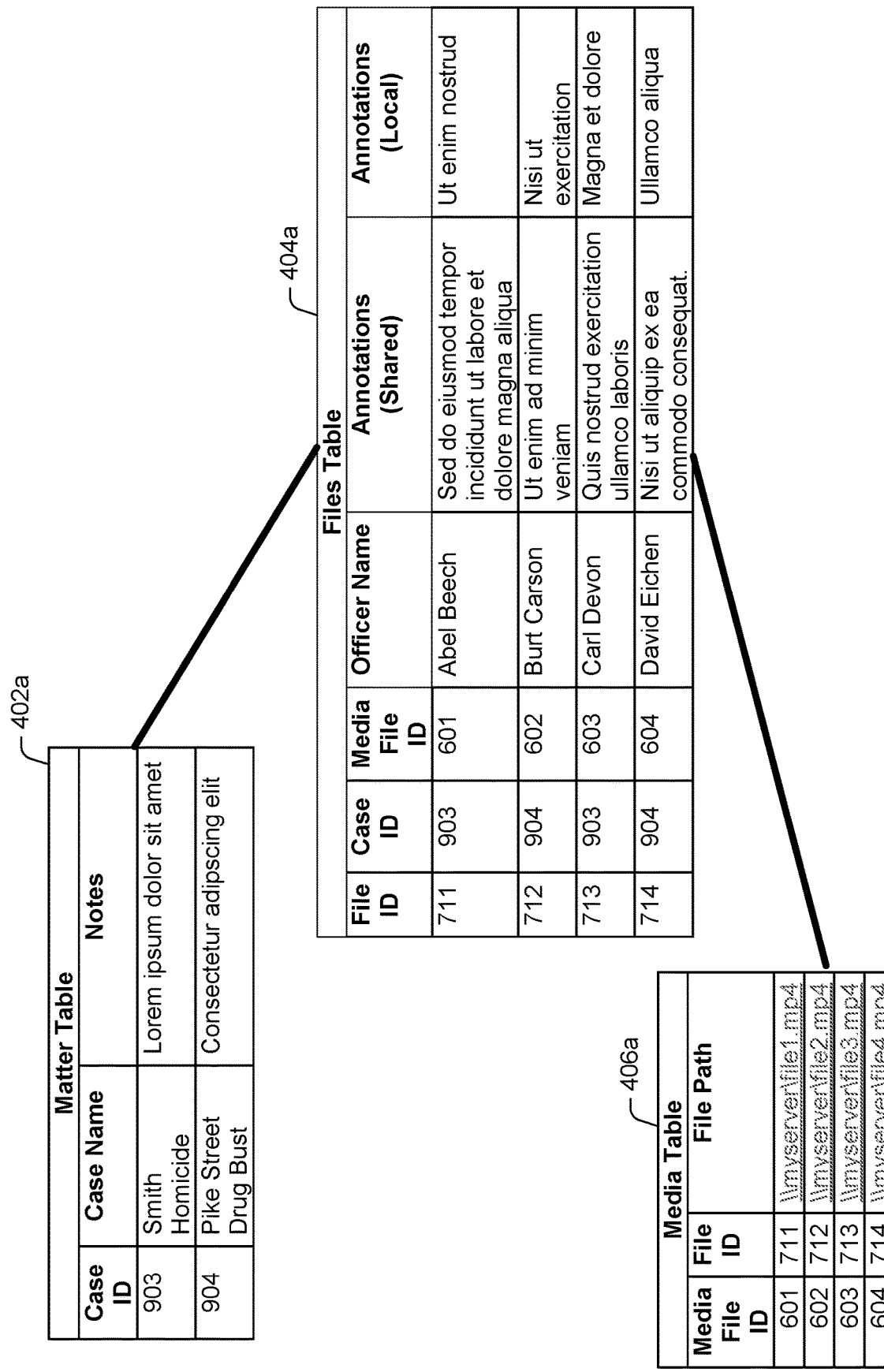

With the foregoing overview of the architecture for implementing a system for correlating the annotations of media files, it may be helpful to discuss the table database structure by way of illustrative example. To that end, FIGS. 4A, 4B, and 4C illustrate example matter, file, and media tables. Each of the FIGS. 4A to 4C, provides a different state of the three tables.

The mechanism to store annotations is by way of a relational database. To that end, there are three tables, namely a matter table 402, a files table 404, and media table 406, structured in a master-detail-detail configuration. A master-detail relationship is a one to many relationship. In a master-detail-detail relationship, there is a master table that has two separate detail records. As used herein, the master is the matter table 402, the first detail is the file table 404, and the third table is the media table 406. All tables that are part of the same group share a unique identifier, referred to herein as the event identifier or the case ID.

In the example of FIG. 4A, there are two existing matters, namely the Smith Homicide (i.e., case ID 903) and the Pike Street Drug Bust (i.e., case ID 904). As new matters are created, the matter table 402*a* automatically generates the case ID (which uniquely identifies a matter group). Similarly, the files table 404*a* and the media file table 406*a* each generate a File ID and a Media File ID, respectively. These IDs are "primary Keys" and are used as references to other tables.

In the example of FIG. 4A, the files table 404*a* has a Case ID field that can be used to identify what Matter record (i.e., Case ID) a particular File ID relates to. As illustrated, File IDs 711 and 713 are related to Case ID 903 (the Smith Homicide) and File ID's 712 and 714 are related to Case ID 904 (the Pike St. Drug Bust). Also, the Files table 404*a* has reference to the media table 406*a* and vice versa. The files table 404*a* stores metadata. In various embodiments, the media table 406*a* stores a reference to a media file location and/or the actual binary file of the media file.

Reference now is made to FIG. 4B, which illustrates an evolution of the tables of FIG. 4A. Consider the scenario where we receive two files: file5.mpg and file6.mpg relating to the Pike St. Drug Bust by Officer 1 and Officer 2 respectively. Since this relates to an existing matter, a new matter record need not be created (and consequently a new Case ID need not be created). However, the file records are added in the file table 404*b* and media table 406*b* (e.g., italicized). Accordingly, the new records in the file table 404*b* are related back to the existing matter table 402*b* (the Pike St. Drug Bust with Case ID 904). Furthermore the records of the file table 404*b* and the media table 406*b* are related to each other via the File ID values 715, 716 and Media File ID values 605, 606.

Reference now is made to FIG. 4C, which illustrates an example scenario where there is no existing event identifier in the matter table for a received media file. For example, two new files are received, namely file7.mpg and file8.mpg, which do not have an existing case ID in matter table 402*c*. In this regard, the event identifier generator 124 of the central server 106 creates a new case ID 905 for case name "Jones Burglary." Accordingly, the additional files (717 and 718 in media table 406*c*) are cross indexed between the files table 404*c* and the media table 406*c*.

By virtue of the data structure discussed herein, if there is an annotation that is to be associated with various media files related to a matter group (e.g., having the same event identifier), the act of adding that annotation to the appropriate record in the matter table 130 automatically associates that annotation to all media files in that matter group having the same event identifier. However, if an annotation is added to a file table 224 without a tag to be shared (e.g., a local annotation), those annotations are not propagated to other media files associated to the same matter group (e.g., case ID).

Transaction Monitor

One consideration with a master-detail-detail relationship is a risk that a change or update to one record may not make an update to another dependent record. For example, consider a scenario where a new group is created. To that end, a matter (or group) record is created in the matter table 130 in the form of an event identifier. A file record in the file table 224 with the same event identifier is created as well. In addition, a file record in the media table 220 with the same event identifier is also created. If, for some reason, a glitch in the system occurs and the media table 220, does not succeed in storing the media file, then the system would be in a corrupt state (e.g., a set of data in the records are inconsistent with each other). To prevent such a situation, the transaction monitor 136 provides a layer of assurance that predetermined operations are either all performed, or none are performed. Specifically, where a first operation and a second operation are to be bound in a transaction, if either of the first or second operations fail, then both operations are undone, or rolled back in the transaction parlance. In this way, the first and second operations are guaranteed to be an atomic, isolated, consistent and durable operation. For example, all media files that have a common identifier share the same annotations that are in the matter table.

As used herein, a transaction is a set of operations that are bundled together in such a way that either all operations succeed, or all of the operations fail together. Thus, the transaction monitor 136 allows all operations to either commit (e.g., be finalized), or rolled back (e.g. be undone). Each operation is performed. If all operations succeed, then the transaction monitor 136 commits all the operations. Otherwise, if one of the operations fail, then all the operations that were performed in a transactions are rolled back. In this way, corrupt states between the three tables (i.e., matter table 130, media table 132, and file table 134) are rendered unlikely.

Chain of Custody

In the case of chain of custody, law enforcement tracks a piece of evidence's handling from source to court. In each leg of the chain of custody, law enforcement certifies and guarantees that the evidence has not been tampered with, providing a court the basis to rely on the evidence. For example, upon uploading a file, a police officer may enter identifying data (e.g., name of the officer, badge number, date of upload, certification of the integrity of the media file. For security, the file may be encrypted and subjected to a message digest to ensure the file has not been tampered with. In some instances, the media files may be post processed. To that end, a cryptographic hash function including a string of digits created by a one-way hashing formula may be used. In this way, the integrity of a media file is protected and alterations to any part of the media file are identified.

For example, an image may be altered (e.g., cropped, panned, adjusted in contrast, adjusted in exposure, filtered, highlighted, and/or enhanced in various other ways). In various embodiments, the analytics engine 126 of the central server 106 may preserve an original version of a media file in additional to one or more modified versions of the media file. The original and modified versions of the media file may be stored as associated data files. The preservation of the original versions of the media files may maintain the chain of custody or safeguard the evidentiary value of the media files in judicial proceedings. Accordingly, in one embodiment, the matter table 130 stored in the central server 106 may include a reference for the media file, the associated annotations, and links to one or more modified versions of the media file.

Post Processing Media Files at the Central Server

As mentioned previously, in various embodiments, the central server 106 is configured to provide post processing of media files via an analytics engine 126. As various media files are received by the file receiving module 120 of the central server 106, not all media files provide clear indicia of belonging to a matter group (e.g., an event identifier). For example, several media recording devices (e.g., 324 o 330) may create media files from locations that are within a close proximity of one another, as indicated by their geolocation. However, it may not be clear whether the media files are of a common event. Further, it may not be clear whether media files in the case management system 118 should be correlated with one or more of these media files. In this regard, the analytics engine 126 determines a probability that various media files should be grouped into a common matter group. If the probability of correlation exceeds a first threshold (e.g., 90%) then the media files are grouped automatically (e.g., attributed a common event identifier). If the probability is below the first threshold but equal or above a second threshold (e.g., 50%), then a "maybe flag" is associated with the corresponding media file.

The media file carrying such maybe flag may be later presented as a suggestion, which may be accepted or rejected by an authorized individual (e.g., a case officer). In various embodiments, an indicia of a "maybe" correlation, sometimes referred to herein as a provisional grouping, may be provided by highlighting the thumbnail of a subject media file by underlining, outlining, applying a special color, pulsating, superimposing appropriate text on the thumbnail of the media file, etc.

For example, if there are two media files (e.g., A and B) and the analytics engine 126 of the central server 106 determines that their probability of belonging to the same group is below the first threshold but equal or above a second threshold (e.g., a "maybe" situation), then during an evaluation of media file A, media file B is presented with a "maybe" highlight. Similarly, during an evaluation of media file B, media file A is presented with a "maybe" highlight. Accordingly, an authorized individual is given the opportunity to confirm or to reject the association in an efficient way. Such provisional groupings are discussed in more detail later in the context of a process flow of FIG. 5.

Example Call Flow Processes

Figure 5:
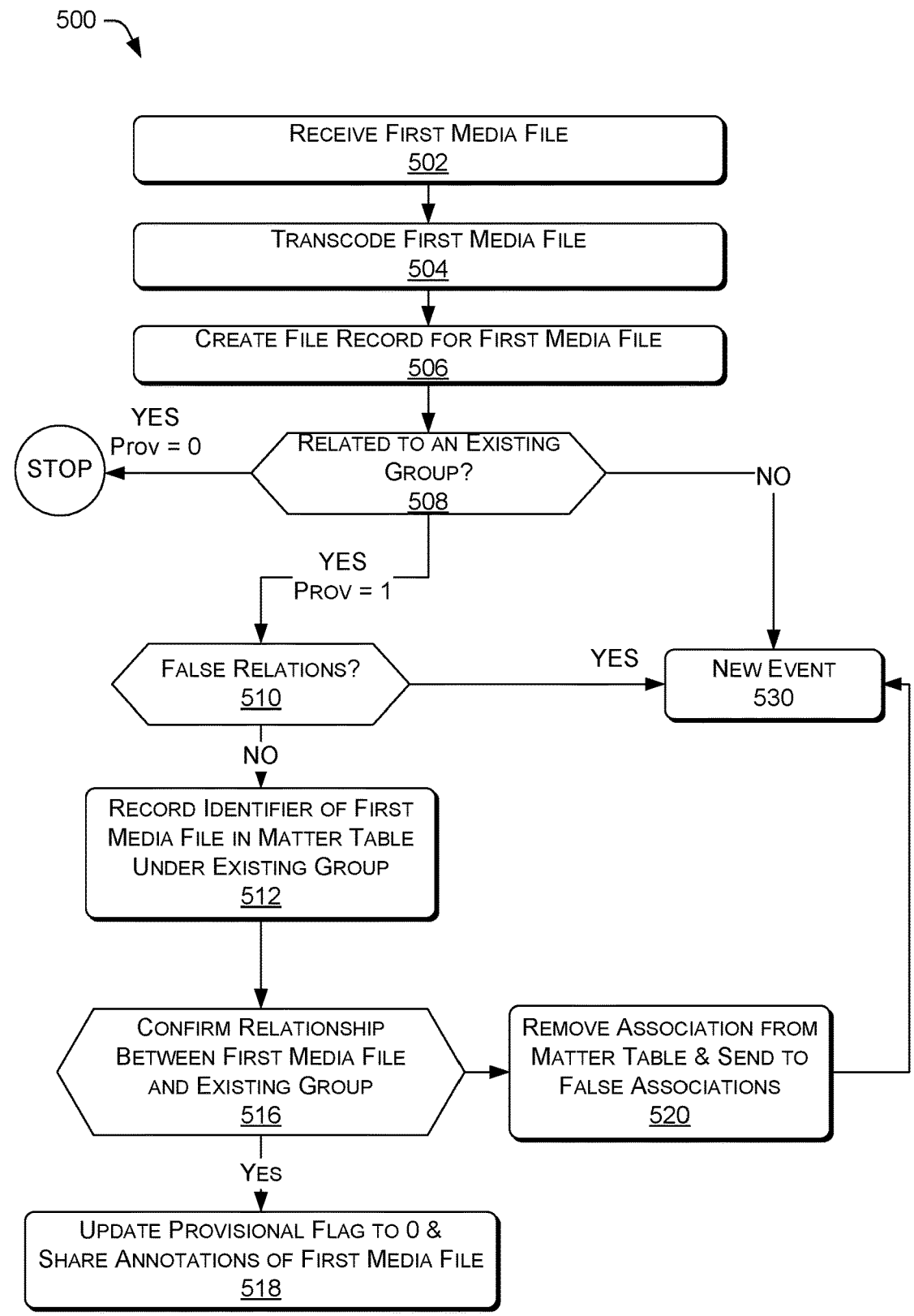
FIG. 5 illustrates a high level example process flow for a provisional grouping of a media file.
Figure 6:
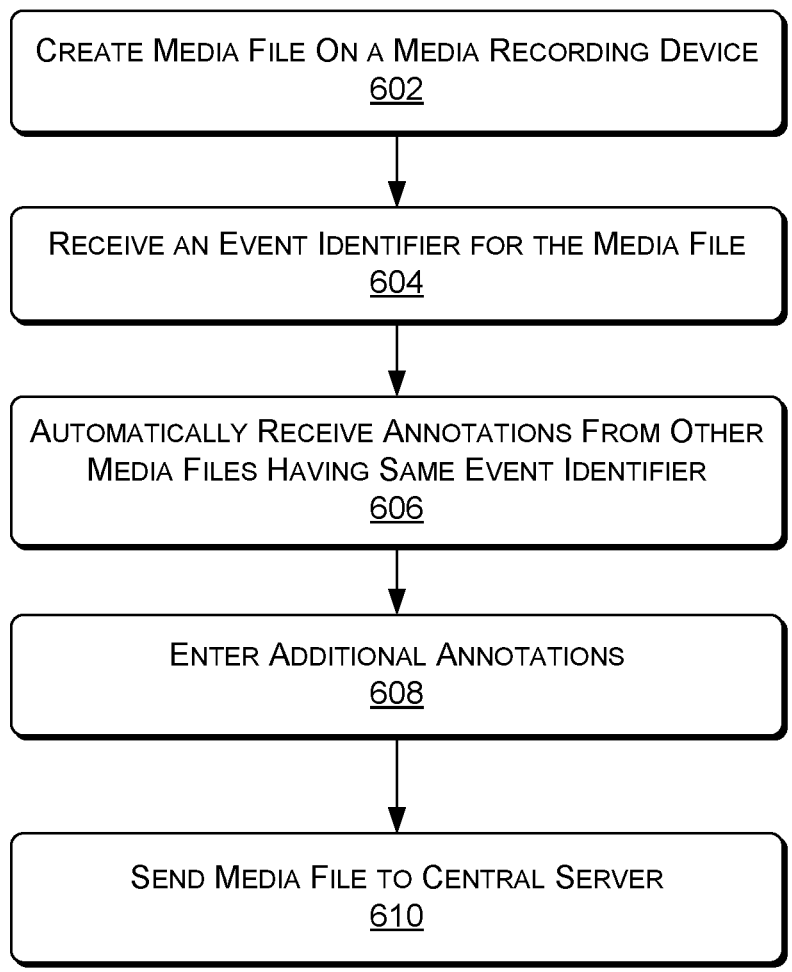
FIG. 6 illustrates a high level example process of automatically annotating a media file from the perspective of a media recording device.

With the foregoing overview of the operation of a system for correlating the annotations of media files, it may be helpful now to consider a high-level discussion of example process flows. To that end, FIGS. 5 and 6 illustrate high level example processes for correlating annotations of media files. In particular, FIG. 5 illustrates a high level example process for a provisional grouping of a media file. FIG. 6 illustrates a high level example process of automatically annotating a media file from the perspective of a media recording device. The call flow processes 500 and 600 are illustrated as a collection of blocks in logical flows, which each represents operations that can be implemented in hardware, software, or a combination thereof.

In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the processes 500 and 600 are described with reference to system 100 of FIG. 1 and the media recording device 200 of FIG. 2.

Provisional Grouping

FIG. 5 illustrates a high level example process that includes a provisional grouping of a media file. At block 502, the central server 106 receives a media file from a media recording device. For example, the media file may be received by the file receiving module 120 of the central server 106.

In one embodiment, at block 504, the media file (e.g., referred to herein as the first media file) is transcoded. For example, an officer may provide an annotation in the form of a voice recording, which may be transcoded into a searchable transcript. It will be understood that this is an optional step because not all media files need to be transcoded.

At block 506 a file record for the media file is created in the matter table 130, if it does not already exist. In this regard, it may be helpful to refer to FIG. 7, which illustrates an example matter table 700. Each event identifier number in the event identifier field (e.g., File Case ID), represents a separate event (e.g., sometimes referred to herein as a matter group), which may have one or more annotations, which may be shared or local. All media files that are in the same group share the same group annotations that are under the "shared" group. The "provisional" column field 708 indicates whether the media file is deemed to belong to the group (e.g., indicated by a "0" in the provisional field), or whether the media file may belong to the same group (e.g., indicated by a "1" in the provisional field). Put differently, a "1" in a cell of the provisional field 708 indicates that the corresponding media file may be related to the group, but has not been confirmed yet.

At block 508, a preliminary determination is made whether the first media file is related to an existing group. It will be understood that an existing group, represented by an identifier number in the Case ID field of table 700, may include any number of media files. In various embodiments, the first media file may be related to a group due to at least one of (i) geolocation, (ii) temporal relation, and (iii) similar signature. The geolocation may be part of the annotations provided in the first media file. For example, the geolocation information may be an automatic time and location stamp of a global positioning receiver of the media recording device that captured the corresponding media file. Regarding the temporal relationship, if several events occur at the same time or have a similar periodicity, then a correlation may be identified by the analytics engine 126 of the central server 106. For example, if several explosions were recorded in different regions at the same time, the coordination of the events at the different locations suggests a common denominator and therefore may be related to the same matter group (e.g., event identifier). Further, a combination of characteristics provided by the annotations may have a common signature (e.g., similar slaying, robbery, drive by shooting, etc.) which may indicate that the first media file may be related to various media files of an existing matter group.

In one embodiment, the analytics engine 126 may receive external data from a case management system 118, which may provide contextual information, such as historical data, trend information, etc., which may be used for appropriate grouping of the media files as well as providing a more complete overview of an event.

In one embodiment, the analytics engine 126 may determine a probability of correlation (e.g., whether the first media file should be grouped together with an existing group). If the probability exceeds a first threshold (e.g., 90%) then the first media file is automatically grouped together under the same event identifier and a provisional flag is set to "0," indicating a good and/or confirmed correlation between the first media file and the existing matter group.

If the probability is below the first threshold but equal or above a second threshold (e.g., 50%), then a record of the first media file is recorded under the same existing event identifier of the group (e.g., file ID 702), but with a "maybe flag." For example, a "1" is placed in the cell in the provisional field 708 next to the media file record of the first media file, as for media file ID 604. If the probability is below the second threshold (e.g., "NO" at decision block 508), then the analytics engine 126 of the central server 106 determines that the first media file does not correspond to an existing group. In this regard, the method continues with block 530, where a new event is created. For example, a new cell is added to the event identifier field 702 with a unique event identifier number. However, if the probability exceeds a first threshold or a second threshold, (e.g., "YES" at decision block 508) then the method continues with block 510.

In various embodiments, different algorithms may be used to correlate the first media file with an existing group. The algorithm may be based on having time stamps and geolocations that are each within predetermined thresholds, respectively.

In one embodiment, the determination of whether the probability exceeds a first threshold or a second threshold is based on machine learning. Machine learning is a subfield of computer science that evolved from the study of pattern recognition and computational learning theory in artificial intelligence. Machine learning may be used herein to construct algorithms that can learn from and make predictions based on the annotations stored for each event identifier, the annotations provided by the media files, and data from the case management system 118. Such algorithms operate by building a model from stored prior inputs or baselines therefrom in order to make data-driven estimates as to whether a media file belongs to an event, rather than following strictly static criteria. Based on the machine learning, the analytics engine may extract patterns and trends from the annotations, which are used to determine whether media files should share the same event identifier.

In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

At block 510, the analytics engine 126 checks a table for false relations. To that end, a false relations table may store the file records (e.g., annotations) of media files that were previously rejected from belonging to the same group (e.g., event identifier). In various embodiments, the false relations table may be stored at the central server 106 at the case management system 118, or another server.

For example, if the first media file has annotations that are substantially similar to those of another media file that was previously rejected to be in the same existing group (e.g., "YES" at decision block 510), then the first media file is automatically rejected and the process continues with block 530, where a new event identifier is created (e.g., the first media file is placed in its own separate matter group).

However, if the first media file does not have annotations that are substantially similar to those of another media file that was previously rejected from being in the same group (e.g., "NO" at decision block 510), then the process continues with block 512, where the media file record of the first media file is recorded under the same group (e.g., event identifier).

At block 516, the relationship between the first media file and the existing group is confirmed. For example, the analytics engine 126 of the central server 106 may provide a user interface to an authorized individual to confirm or to reject the association of the media file with the matter group. In one embodiment, all the media files that are part of the same group are displayed together (e.g., in a thumbnail or list view). The first media file, which has been attributed a provisional=0 status, (e.g., "may" belong to the same group) is highlighted (e.g., by underlining, outlining, applying a special color, pulsating, superimposing appropriate text on the thumbnail of the media file, etc.). Alternatively, the first media file may be separated by a line on the display (e.g., where the provisional=0 status are on the left and the provisional=1 are on the right side of the screen).

The authorized individual may select the thumbnail of the first media file to confirm that the first media file should be in the same group (e.g., right click on the device and choose "confirm" or simply drag the thumbnail to the left side of the screen) (e.g., "YES" at block 516.) In this regard, at block 518, the highlight is removed and the provisional status is updated to 0 (e.g., confirmed to be in the same group). Consequently, the annotations of the group (e.g., having the same event identifier) are shared with the first media file and the annotations of the first media file that are to be transferred (e.g., flagged for the matter table) are shared with the matter group.

However, if the authorized individual indicates that the first media file does not belong to the group (e.g., right click on the device and choose "reject") (e.g., "NO" at decision block 516), then at block 520, the media file record of the first media file is removed from the event identifier of the group.

Consequently, at block 530, a new event identifier is created for the first media file.

Automatic Annotation

As mentioned previously, the sharing of annotations of media files having a common event identifier is not limited to the central server 106. Rather, in one embodiment, the annotations may propagate to a media file while it is still at the media recording device. In this regard, FIG. 6 illustrates a high level example process 600 of automatically annotating a media file from the perspective of a media recording device.

At block 602, a media file is created on a media recording device (e.g., 102(1) in FIG. 1).

At block 604, an event identifier for the media file is received from a central server. In various embodiments, the event identifier may be received from the central server upon request or at a predetermined interval. For example, in various embodiments, the request from the media recording device 102(1) to the central server 106 may be sent at the beginning of the recording, at the completion of the recording, during the recording, or whenever a network 108 connection becomes available. In one example, the central server 106 periodically pings (e.g., electronically communicates) with the media recording device 102(1) to determine if a media recording is in progress or recently captured, at which point, the an event identifier for the media file is sent to the media recording device 102(1) for the particular media file.

In various embodiments, receiving an event identifier includes the media device 102(1) first sending a data packet to the central server, including at least one of (i) a geolocation of the media file at the time of recording; (ii) a timestamp of the media file at the time of recording; (iii) a device identification of the media recording device; and (iv) an identification of the operator of the media recording device. In one embodiment, the first data packet includes annotations that are already available on the media recording device e.g., stored in a file table or flagged for the matter table. This first data packet may be used by the central server 106 to identify an existing matter group (e.g., event identifier) to which this media file may belong. If the central server 106 determines that the present media file does not belong to an existing group, then a new event identifier is created and sent to the media recording device 102(1).

At block 606, the media recording device 102(1) receives the annotations having the same event identifier from the matter table 130 of the central server 106. The matter table includes the annotations of all media files that are flagged to be shared with the group. In various embodiments, the first set of annotations is sent by the central server 106 to the media recording device 102(1) with the event identifier, or in later in a separate data packet. As more annotations become available (e.g., as they are received by the central server 106) from other media recording devices (e.g., 102(2) to 102(N)) that have the same event identifier, additional data packets having updated annotations are sent to the media recording devices that have media content that is in the same matter group. These updates may be performed periodically, when new annotations are available, or when a network 108 connection is available.

At block 608, the operator of the media recording device 102(1) is provided an opportunity to enter additional annotations related to a media file, on the display 214 of the media recording device 102(1). These annotations may be stored in a file table 224, or in a memory of the media recording device 102(1) flagged to be stored in a matter table. As discussed previously, annotations that are not flagged to be shared in the file table are not propagated to other media files having the same event identifier. However, entries that are flagged for the matter table are shared automatically with other media files. For example, as soon as the annotations that are meant to be shared are received, the annotations are sent to all the media recording devices that have media files having a common event identifier.

In one embodiment, the operator of the media recording device 102(1) may perform some pre-processing directly on the media recording device 102(1). For example, the operator may drag and drop media files (e.g., icons thereof) on top of one another or into a folder, using the display 214 of the media recording device 102(1). Media files that share a common folder automatically are linked to the same annotations that are flagged to be shared in the file table. However, the annotations that are not flagged in the file table are not shared.

At block 610, the media file(s) 219 are sent to the central server 106 over the network 108. As discussed previously, the media file 219 has a media table 220 component and a file table 224 component. In various scenarios, the media content may be streamed live to the central server 106, sent immediately upon completion, sent as soon as a network connection 108 is available, uploaded by the media recording device (e.g., after arriving at a police station), or sent upon request from the central server 106.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Based upon design preferences, it is understood that the specific order or hierarchy of steps in the processes described herein may be rearranged, expanded, and some steps omitted. Some of the blocks may be performed simultaneously.

Unless otherwise stated, any measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A central server, comprising:
   one or more processors;
   a network interface coupled to the one or more processors configured to enable communications via a communication network;
   storage for content and programming;
   a database stored in the storage, the database storing records of media files; and
   instructions stored in the storage, wherein execution of the instructions by the one or more processors configures the central server to perform acts comprising:
   providing an event identifier that identifies an event to a first media recording device;
   receiving a first media file from the first media recording device, the first media file providing indicia that associates the first media file with the event identifier;
   relating, in the database, the event identifier, the first media file, and one or more first annotations;

determining that the first media file belongs to a matter group, wherein a matter group is one or more files that are related to the same event identifier in the database, and wherein the first media file is determined to belong to a matter group because the first media file and one or more other files are related to the same event identifier in the database;

in response to determining that the first media file belongs to a matter group:
  automatically propagating one or more of the first annotations of the first media file that are flagged in the database to be shared, to all media files of the matter group; and
  automatically propagating annotations of all media files of the matter group to the first media file;

receiving a second media file from a second media recording device, the second media file lacking indicia that associates the second media file and the event identifier;

relating, in the database, the second media file and one or more second annotations;

determining that the first media file and the second media file share an annotation in the database; and in response to determining that the first media file and the second media file share an annotation, relating the event identifier to the second media file in the database;

wherein:
  the database is a relational database that includes a matter table, a file table, and a media table;
  the matter table is a master table;
  the file table is a detail tale having a first field that includes annotations that are flagged to be shared with other media files of the matter group and a second field that includes annotations that are not flagged to be shared with other media files of the matter group;
  the media table includes at least one of (i) a binary file of the media content of the first media file, or (ii) a reference to a location of the first media file;
  the relating of the event identifier, the first media file, and the one or more first annotations, relates the event identifier and the first media file in the file table;
  the automatically propagating of the one or more first annotations of the first media file that are flagged to be shared to all media files of the matter group, automatically propagates the one or more first annotations to all media files of the matter group in the file table; and
  the automatically propagating of annotations of all media files of the matter group to the first media file, automatically propagates the annotations to the first media file in the file table.

2. The central server of claim 1, wherein execution of the instructions further configures the central server to perform an act comprising: transcoding the first media file upon receiving the first media file.

3. The central server of claim 1, wherein determining whether the first media file belongs to a matter group comprises:
  extracting first characteristics, comprising a geolocation and a time of creation of the first media file and a device identification of the first media recording device from the one or more first annotations of the first media file that are flagged to be shared and not flagged to be shared, from the file table; and
  correlating the first characteristics with one or more matter groups of the matter table.

4. The central server of claim 1, wherein execution of the instructions further configures the central server to perform acts comprising:
  upon determining that the first media file belongs to a matter group, determining a probability of correlation between the first media file and the matter group;
  upon determining that the probability exceeds a first threshold, setting a provisional flag to a first level fora file record in the file table that is associated with the first media file, wherein setting the provisional flag to the first level indicates a good correlation; and
  upon determining that the probability meets or exceeds a second threshold but is below the first threshold, setting the provisional flag to a second level forth e file record in the file table to indicate an unconfirmed correlation.

5. The central server of claim 4, wherein execution of the instructions further configures the central server to perform acts comprising:
  upon determining that the probability of correlation meets or exceeds the second threshold but is below the first threshold:
  soliciting a confirmation that the first media file belongs to the matter group; and
  upon receiving the confirmation that the first media file belongs to the matter group, setting the provisional flag to the first level for the file record in the matter table to indicate a confirmed match.

6. The central server of claim 4, wherein execution of the instructions further configures the central server to perform acts comprising:
  upon determining that the probability of correlation meets or exceeds the second threshold but is below the first threshold:
  soliciting a confirmation that the first media file belongs to the matter group; and
  upon receiving a rejection indicating that the first media file does not belong to the matter group, removing the first media file from the matter group.

7. The central server of claim 1, wherein execution of the instructions further configures the central server to perform acts comprising:
  upon determining that the first media file belongs to a matter group, referring to a false relations table in the database to determine whether the second media file, having one or more second annotations that are flagged to be shared that are substantially similar to the one or more first annotations that are flagged to be shared of the first media file, was previously rejected from the matter group; and
  upon determining that the second media file was previously rejected, identifying that the first media file does not belong to the matter group.

8. The central server of claim 1, wherein execution of the instructions further configures the central server to perform an act comprising, upon determining that the first media file belongs to a matter group, receiving supplemental information related to the matter group from a case management system configured to provide contextual information.

9. A non-transitory computer-readable medium having stored thereon a plurality of instructions which, when executed by one or more processors, cause the one or more processors to perform a method comprising:
  providing an event identifier that identifies an event to a first media recording device;
  receiving a first media file from the first media recording device, the first media file providing indicia that associates the first media file with the event identifier;

relating, in a database, the event identifier, the first media file, and one or more first annotations;
determining that the first media file belongs to a matter group, wherein a matter group is one or more files that are related to the same event identifier in the database;
in response to determining that the first media file belongs to a matter group:
  automatically propagating one or more of the first annotations of the first media file that are flagged in the database to be shared, to all media files of the matter group; and
  automatically propagating annotations of all media files of the matter group to the first media file;
receiving a second media file from a second media recording device, the second media file lacking indicia that associates the second media file and the event identifier;
relating, in the database, the second media file and one or more second annotations;
determining that the first media file and the second media file share an annotation in the database; and
in response to determining that the first media file and the second media file share an annotation, relating the event identifier to the second media file in the database;
wherein:
  the database is a relational database that includes a matter table, a file table, and a media table;
  the matter table is a master table;
  the file table is a detail tale having a first field that includes annotations that are flagged to be shared with other media files of the matter group and a second field that includes annotations that are not flagged to be shared with other media files of the matter group;
  the media table includes at least one of (i) a binary file of the media content of the first media file, or (ii) a reference to a location of the first media file;
  the relating of the event identifier, the first media file, and the one or more first annotations, relates the event identifier and the first media file in the file table;
  the automatically propagating of the one or more first annotations of the first media file that are flagged to be shared to all media files of the matter group, automatically propagates the one or more first annotations to all media files of the matter group in the file table; and
  the automatically propagating of annotations of all media files of the matter group to the first media file, automatically propagates the annotations to the first media file in the file table.

10. The method of claim 9, further comprising:
extracting first characteristics, comprising a geolocation and a time of creation of the first media file and a device identification of the first media recording device from the one or more first annotations of the first media file that are flagged to be shared and not flagged to be shared, from the database; and
correlating the first characteristics with one or more matter groups of the database.

* * * * *